United States Patent
Van Den Bossche et al.

(10) Patent No.: US 8,508,405 B2
(45) Date of Patent: Aug. 13, 2013

(54) METHOD FOR PROTECTING A RADIO NAVIGATION RECEIVER USER AGAINST ABERRANT PSEUDO-RANGE MEASUREMENTS

(75) Inventors: Mathias Van Den Bossche, Goyrans (FR); Philippe Karouby, Balma (FR); Christophe Macabiau, Montauban (FR); Philippe Paimblanc, Toulouse (FR)

(73) Assignee: Thales, Neuilly sur Seine ( * ) Notice: Subject to any disclaimer, the term of this patent is extended or adjusted under 35 U.S.C. 154(b) by 315 days.

(21) Appl. No.: 12/995,688

(22) PCT Filed: May 6, 2009

(86) PCT No.: PCT/EP2009/056963
§ 371 (c)(1),
(2), (4) Date: Jan. 28, 2011

(87) PCT Pub. No.: WO2009/147242
PCT Pub. Date: Dec. 10, 2009

(65) Prior Publication Data
US 2011/0122022 A1 May 26, 2011

(30) Foreign Application Priority Data
Jun. 6, 2008 (FR) ...................................... 08 03169

(51) Int. Cl.
*G01S 19/20* (2010.01)
*G01S 19/08* (2010.01)

(52) U.S. Cl.
USPC .................................. 342/357.58; 342/357.45

(58) Field of Classification Search
USPC .......................................... 342/357.45, 357.58
See application file for complete search history.

(56) References Cited

U.S. PATENT DOCUMENTS

| 6,707,422 B2 * | 3/2004 | Sheynblat et al. ....... 342/357.25 |
| 2008/0074317 A1 | 3/2008 | Harper et al. |

FOREIGN PATENT DOCUMENTS

EP 1 729 145 12/2006

OTHER PUBLICATIONS

Brown R. Grover, et al.: "Receiver Autonomous Integrity Monitoring," Global Positioning System: Theory and Applications; [Progress in Astronautics and Aeronautics vol. 163], Washinton, DC, AIAA, US, vol. 2, Jan. 1, 1996, pp. 143-165, XP008090948.

Walter, et al.: "Weighted RAIM for Precision Approach," Proceedings of the Institute of Navigation (ION) GPS, XX, XX, Sep. 1, 1995, pp. 1995-2004, XP002351332.

Tsai, Y-H, et al.: "GPS fault detection and exclusion using moving average filters," IEE Proceedings: Radar, Sonar & Navigation, Institution of Electrical Engineers, GB, vol. 151, No. 4, Aug. 9, 2004, pp. 240-247, XP006022285.

* cited by examiner

*Primary Examiner* — Cassie Galt
(74) *Attorney, Agent, or Firm* — Baker & Hostetler, LLP

(57) ABSTRACT

The present invention relates to a method for protecting a radionavigation receiver user in relation to aberrant pseudo-range measurements. In the method, a measurement error is detected by a statistical estimation scheme based on calculating the residuals of the measurements.

8 Claims, 1 Drawing Sheet

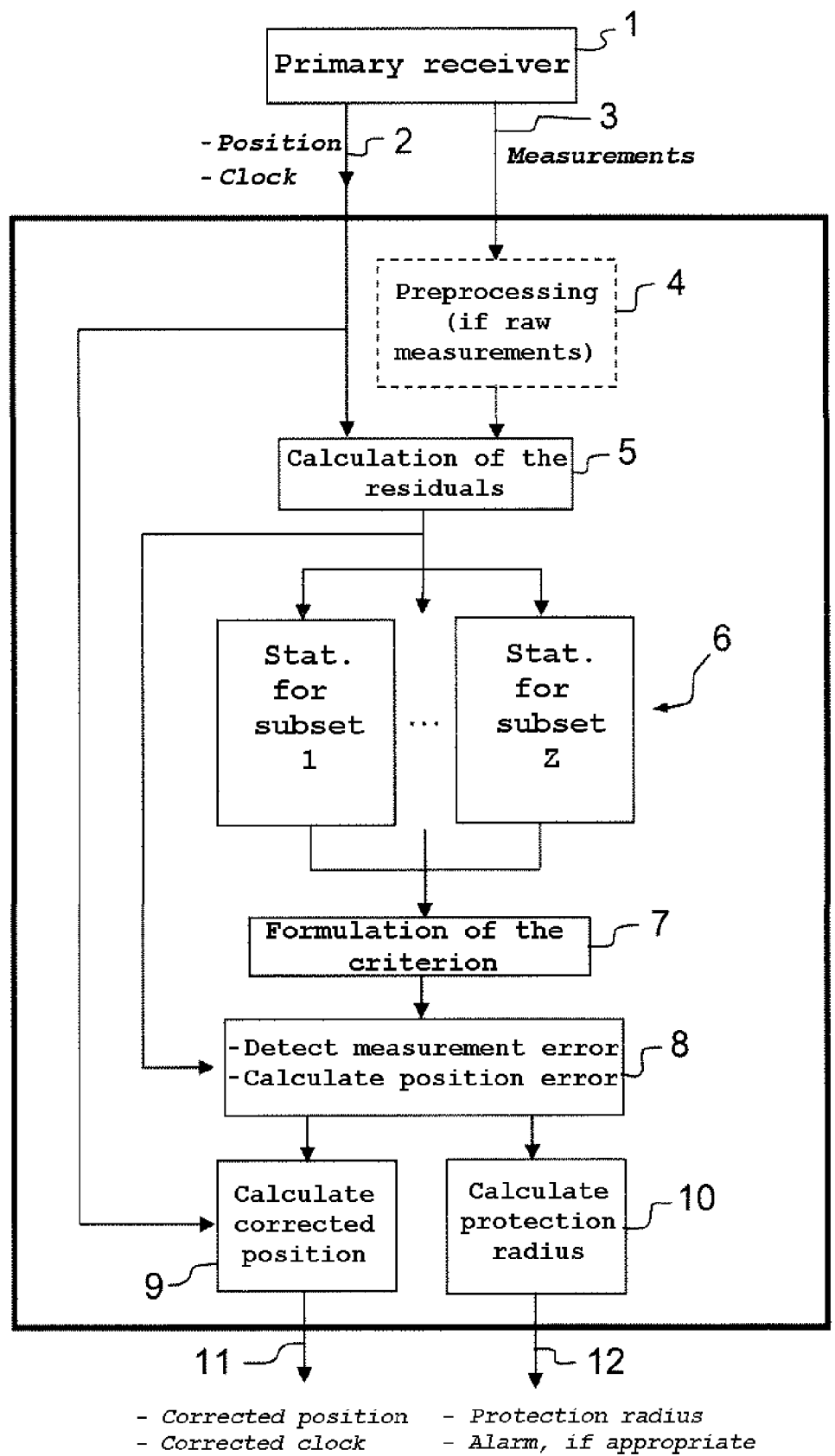

METHOD FOR PROTECTING A RADIO NAVIGATION RECEIVER USER AGAINST ABERRANT PSEUDO-RANGE MEASUREMENTS

CROSS-REFERENCE TO RELATED APPLICATIONS

This application is a National Stage of International patent application PCT/EP2009/056963, filed on May 6, 2009, which claims priority to foreign French patent application No. FR 08 03169, filed on Jun. 6, 2008, the disclosures of which are incorporated by reference in their entirety.

FIELD OF THE INVENTION

The present invention pertains to a method for protecting a radionavigation receiver user in relation to aberrant pseudo-range measurements.

BACKGROUND OF THE INVENTION

The error in the geographical position indicated by a satellite-based radio-navigation receiver depends on the errors which mar the measurements of pseudo-ranges determined by the algorithm used by this receiver and on the errors contained in the navigation message broadcast by the satellite.

In order to limit these errors and to ensure the protection of users, it is necessary to have means making it possible to identify such errors so that they can be eliminated and to calculate a bound on the position error as a function of the available measurements, while taking account of integrity and continuity specifications inherent to the context of use (landing of an aircraft, etc.). These means constitute the basis of a device having a RAIM (Receiver Autonomous Integrity Monitoring) function. Current GNSS receivers for civil aviation may not be used without a RAIM function.

Current equipment with a RAIM function suffers from two problems:
- said equipment is completely integrated, thereby signifying that it is not possible to separately choose the item of equipment which acquires the navigation signal and the one which calculates the position of the item of equipment which provides the integrity functions,
- said equipment is based on algorithms of least squares type which is destabilized by the presence of erroneous measurements whatever the amplitude (even infinitesimal) of the error which affects these measurements, thereby posing problems with the reliability of the position solutions proposed.

SUMMARY OF THE INVENTION

The subject of the present invention is a method for protecting a radionavigation receiver user in relation to aberrant pseudo-range measurements, this method possibly being implemented by an item of equipment independent of the one which acquires the navigation signal and which calculates the position of the item of equipment providing the integrity functions, and which is not destabilized by the presence of erroneous measurements, whatever the amplitude of the errors affecting these measurements.

The method of protection in accordance with the invention is characterized, in the most general case, in that the N residuals of the estimation of the state vector are weighted during the estimation of the navigation solution, the weighting being carried out in accordance with the estimated statistic of the errors of these measurements, using robust statistical estimators (such as the Least Trimmed Squares Estimator, or Minimum Covariance Determinant Estimator, or M-estimator, or A-, D-, GM-, L-, MM-P-, R-, S- or W-estimators or MSTD), this weighting possibly being total or partial. If it is total, the consideration of the residuals is total, with a weighting factor equal to 1 or equal to 0 for exclusion, and, if it is partial, the weighting factor lies between 0 and 1. The case of total weighting covers, inter alia, the "RAIM-MSTD" and "RAIM-LTS" robust schemes, and the case of partial weighting covers the robust schemes of "RAIM-M-estimators" type. Robust statistical estimators are well known per se, and are described, for example, in the references cited at the end of this article.

According to another characteristic of the invention, the subset of h residuals of the estimation of the state vector of least variance is selected, and this variance, augmented by an adaptation coefficient, together with the mean of the same subset, are used to center and then normalize the N inputs, which, once squared, are compared with a statistical threshold and rejected if they are greater than this threshold, with h=N−1 and/or N−2, N being the number of residuals. The aim of the comparison with the statistical threshold is to not have to systematically isolate the h residuals of the estimation of the state vector. This is the "RAIM-MSTD" scheme.

According to another characteristic of the invention, the subset of N-h residuals of the estimation of the state vector is selected such that the sum of these measurements squared is a minimum, the mean and the variance of this subset are estimated, and this mean and this variance (the latter advantageously being multiplied by an adaptation coefficient of greater than 1) are used to center and then normalize the N inputs, which, once squared, are compared with a statistical threshold and rejected if they are greater than this threshold. This is the "RAIM-LTS" scheme.

According to another characteristic of the invention, the N residuals of the estimation of the state vector are weighted by an iterative scheme which consists, at each iteration, in estimating the mean and the variance of the residuals of the estimation of the state vector, in calculating weights with the aid of a weighting function whose inputs are the centered residuals normalized by the variance, and in multiplying the residuals by these weights, the iterative process stopping when the sum of the squares of the differences between two consecutive residuals is less than a threshold, the mean and the variance (the latter augmented by an adaptation coefficient) which arise from this process being used to center and then normalize the N inputs, which, once squared, are compared with a statistical threshold and rejected if they are greater than this threshold. This is the "RAIM-M-estimators" scheme.

In a detailed manner, the method of protection in accordance with the invention is characterized in that it comprises the following steps of calculating the integrity indicator by calculating the residuals of measurements of pseudo-ranges obtained on the basis of the geographical position and the clock shift provided by a primary radionavigation receiver and on the basis of the measurements used by the primary receiver to obtain these values:
- Formation of all the subsets of residuals of cardinal h=N−1 and/or N−2, N being the number of residuals,
- Calculation of the standard deviation of each subset and determination, $\sigma_{min}$ being the smallest standard deviation and used to weight the residuals, $h_{min}$ the value of cardinal for which $\sigma_{min}$ has been obtained, $Y_{min}$ the vector of corresponding cardinal $h_{min}$, and $m_{min}$ the mean of $Y_{min}$, Calculation of a first vector defined by:

$$r_{vec,1} = \frac{\sqrt{(Y - m_{min})^2}}{\sigma_{min}}$$

the vectors $r_{vec,1}$ are sorted in ascending order to obtain:

$$r_{vec,1}^{sorted}$$

calculation of the factor f defined by:

$$f = (\chi^2)^{-1}\left(\frac{h_{min}}{N}, 1\right),$$

where $(X^2)^{-1}$ (.,1) is the inverse of the $X^2$ distribution with one degree of freedom, $\sigma_{min}$ is then re-weighted in the following manner:

$$\sigma_{min,2} = \sqrt{\frac{r_{vec,1}^{sorted}(h_{min})}{f}} * \sigma_{min}$$

calculation of a new vector of residuals:

$$r_{vec,2} = \frac{\sqrt{(Y - m_{min})^2}}{\sigma_{min,2}}$$

definition of a threshold T such that:

$T=(X^2)^{-1}(P,1)$, where P is a probability whose optimal value must be determined by probabilistic simulation, Each element of $r_{vec,2}$ is compared with T. If $r_{vec,2}(i) > T$, a fault is declared to have been detected, and satellite i is excluded.

BRIEF DESCRIPTION OF THE DRAWINGS

The present invention will be better understood on reading the detailed description of an embodiment, taken by way of nonlimiting example and illustrated by the appended drawing in which:

the single FIGURE is a simplified diagram of the successive steps for implementing the method of the invention.

DETAILED DESCRIPTION

In the diagram of the drawing, 1 symbolizes a conventional primary satellite-based radionavigation receiver providing on the one hand, on a path 2, the solution estimated by the primary receiver (geographical position and clock shift), and on another path 3 the measurements of pseudo-ranges used by the primary receiver to obtain the solution.

If the measurements transmitted by the primary receiver are not preprocessed, they should be made to undergo a preprocessing, known per se, ridding them of propagation and measurement errors, as is symbolized by the dashed rectangle 4.

The calculation of the integrity indicator then comprises the following steps, on the basis of the calculation of the residuals (5) of measurements of pseudo-ranges (said residuals being denoted Yi, where i is the index of the satellite, and N is the number of these residuals):

1. Formation of all the subsets of residuals of cardinal h=N−1 and/or N−2,
2. Calculation of the standard deviation of each subset (6). Let $\sigma_{min}$ be the smallest standard deviation. The latter is taken as reference (7). We then define:
   a. $h_{min}$ the value of cardinal for which $\sigma_{min}$ has been obtained
   b. $Y_{min}$ the vector of corresponding cardinal $h_{min}$,
   c. $m_{min}$ the mean of $Y_{min}$.
3. $\sigma_{min}$ is used to weight the residuals. A first vector is calculated such that:

$$r_{vec,1} = \frac{\sqrt{(Y - m_{min})^2}}{\sigma_{min}}$$

4. For the various satellites, the first vectors $r_{vec,1}$ are sorted in ascending order to obtain:

$$r_{vec,1}^{sorted}$$

Also calculated is the factor f defined by:

$$f = (\chi^2)^{-1}\left(\frac{h_{min}}{N}, 1\right),$$

where $(X^2)^{-1}$ (,1)
is the inverse of the $X^2$ distribution with one degree of freedom.
5. $\sigma_{min}$ is then re-weighted in the following manner:

$$\sigma_{min,2} = \sqrt{\frac{r_{vec,1}^{sorted}(h_{min})}{f}} * \sigma_{min}$$

6. A new vector of residuals is calculated:

$$r_{vec,2} = \frac{\sqrt{(Y - m_{min})^2}}{\sigma_{min,2}}$$

7. The threshold T is defined by:

$T=(X^2)^{-1}(P,1)$, where P is a probability whose optimal value must be determined by simulation by a probabilistic technique of "Monte-Carlo" type.
8. Each element of $r_{vec,2}$ is compared with T. If $r_{vec,2}(i) > T$, a fault is declared to have been detected, and satellite i is excluded (8).
9. Once the detection of possibly flawed measurements has been performed, the calculation of the protection radii (10) can be done in the customary manner having regard to the number of measurements adopted.

It will be noted that P, which represents the probability of excluding a non-flawed satellite, cannot however be directly likened to the probability of exclusion specified by the OACI.

Moreover, the test at point 8 is performed independently for each satellite: there is therefore no detection without exclusion.

The outputs of this device are therefore:

A possibly corrected position solution (11), if an error in the input measurements is detected.

A value of protection radius (12) which makes it possible to guarantee the position solution for the device, possibly including an alarm.

The method of the invention makes it possible, in a manner which is autonomous of any ground segment (therefore implementing a RAIM functionality):

- to boost the performance of an off-the-shelf receiver (termed "primary") without any integrity function,
- to detect possible errors contaminating measurements on input to the calculation of the position, through the use of a robust estimation statistical algorithm, that is to say one truly unaffected by measurement errors, and implementing a dynamic criterion,
- to calculate a robust correction for the position provided by the primary receiver by excluding such an error if it is detected,
- to calculate bounds on the position error as a function of the available measurements, and by taking account of integrity and continuity specifications inherent to the context of use (for example in an aircraft landing phase). These bounds are thresholds which must not be exceeded more than once for N range measurements, with $N=10^5$ to $10^7$, for example,
- to achieve superior performance to that of the standard RAIM algorithm (using the least squares scheme).

Because there is currently no method making it possible to add an integrity function to a receiver not providing it at source, the devices of the prior art, in order to obtain equivalent integrity/availability performance, cannot use the usual algorithms. To improve performance, the other possible path would be to use sequential or filtering processings, but, since the undertaking of such processing for position estimation is excluded (integrity alarm time too long, it being for example of the order of 6 seconds for civil applications, but possibly of the order of several hundred seconds with effective filtering), there is no other totally autonomous solution for ensuring integrity at this level of performance.

The method of the invention makes it possible to optimize the choice of the hardware for acquiring the navigation signal independently of that for RAIM processing.

The RAIM method rendered robust according to the invention makes it possible to enhance the reliability of position estimation (geographical position), by improving the integrity performance (detection and exclusion) with respect to a standard RAIM.

This method affords an ability to detect and exclude flawed GNSS measurements that is optimized with respect to the standard RAIM. In particular, it makes it possible to improve the availability rate of a GNSS system compatible with civil aviation requirements.

To summarize, the method of the invention offers much better performance than that of the standard algorithms both in terms of integrity (detection) and availability (false alarms, optimization of the protection radii) and may be applied to a radionavigation receiver not possessing any source of RAIM protection rendered robust against measurement errors.

The invention claimed is:

1. A method of processing radionavigation receiver signals, the method comprising:

providing, at an equipment with a Receiver Autonomous Integrity Monitoring (RAIM) functionality, measurements of pseudo-ranges between a plurality of satellites and a primary radionavigation receiver;

providing, at the equipment, a geographical position and a clock shift of the primary radionavigation receiver;

calculating, at the equipment, residuals of measurements of pseudo-ranges obtained on the basis of the geographical position and the clock shift provided by said primary radionavigation receiver and on the basis of measurements of pseudo-ranges provided by said primary radionavigation receiver, said residuals being denoted by $Y_i$, where i is an index of a satellite i in the plurality of satellites;

forming, at the equipment, subsets of the residuals of a cardinal denoted by $h=N-1$ and/or $N-2$, N being the number of said residuals;

calculating, at the equipment, a standard deviation of each subset with $\sigma_{min}$ being a smallest standard deviation and used as reference to weight said residuals;

determining, at the equipment, a minimum value $h_{min}$ of the cardinal for which said $\sigma_{min}$ was calculated, a value of $Y_{min}$, a vector of corresponding cardinal $h_{min}$, and a value of $m_{min}$, $m_{min}$ being a mean value of $Y_{min}$;

for each satellite i, calculating, at the equipment, a first vector of residuals defined by:

$$r_{vec,1} = \frac{\sqrt{(Y_i - m_{min})^2}}{\sigma_{min}}$$

for the plurality of satellites, sorting, at the equipment, elements of the first vector $r_{vec,1}$ in ascending order to obtain a sorted vector $r_{vec,1}^{sorted}$;

calculating, at the equipment, a factor f defined by:

$$f = (\chi^2)^{-1}\left(\frac{h_{min}}{N}, 1\right),$$

where $(\chi^2)^{-1}(.,1)$ is an inverse of a Chi-squared $x^2$ statistic distribution with one degree of freedom;

weighting at the equipment, said $\sigma_{min}$ in the following manner:

$$\sigma_{min,2} = \sqrt{\frac{r_{vec,1}^{sorted}(h_{min})}{f}} * \sigma_{min}$$

for each said satellite, calculating, at the equipment, a new vector of residuals defined by:

$$r_{vec,2} = \frac{\sqrt{(Y_i - m_{min})^2}}{\sigma_{min,2}};$$

defining, at the equipment, a threshold T such that: $T=(\chi^2)^{-1}(P,1)$, where P is a probability whose optimal value is determined by a probabilistic simulation; and comparing, at the equipment, each element of the new vector of residuals $r_{vec,2}$ with the threshold T and if $r_{vec,2}(i) > T$, a fault is declared to have been detected, and said satellite i is excluded.

2. The method of claim 1, wherein the probabilistic simulation used for the definition of the threshold T is a scheme of the Monte-Carlo type.

3. The method of claim 1, wherein, the measurements provided by the primary radionavigation receiver are preprocessed to remove propagation and measurement errors.

4. The method of claim 1, wherein a corrected position is calculated when an error in the measurements is detected.

5. The method of claim 1, wherein a corrected clock value is calculated when an error in the measurements is detected.

6. The method of claim 1, wherein protection radii relating to the measurements are calculated in a customary manner.

7. The method of claim 1, wherein an alarm is emitted when an error in the measurements is detected.

8. The method of claim 1, wherein the the primary radionavigation receiver does not posses a source of robust protection against measurement errors.

* * * * *

UNITED STATES PATENT AND TRADEMARK OFFICE
CERTIFICATE OF CORRECTION

PATENT NO. : 8,508,405 B2
APPLICATION NO. : 12/995688
DATED : August 13, 2013
INVENTOR(S) : Mathias Van Den Bossche et al.

It is certified that error appears in the above-identified patent and that said Letters Patent is hereby corrected as shown below:

On the title page Item "(22) PCT Filed:"

Please replace "May 6, 2009" with --June 5, 2009--.

Signed and Sealed this
Eighth Day of October, 2013

Teresa Stanek Rea
*Deputy Director of the United States Patent and Trademark Office*